Figure 1:
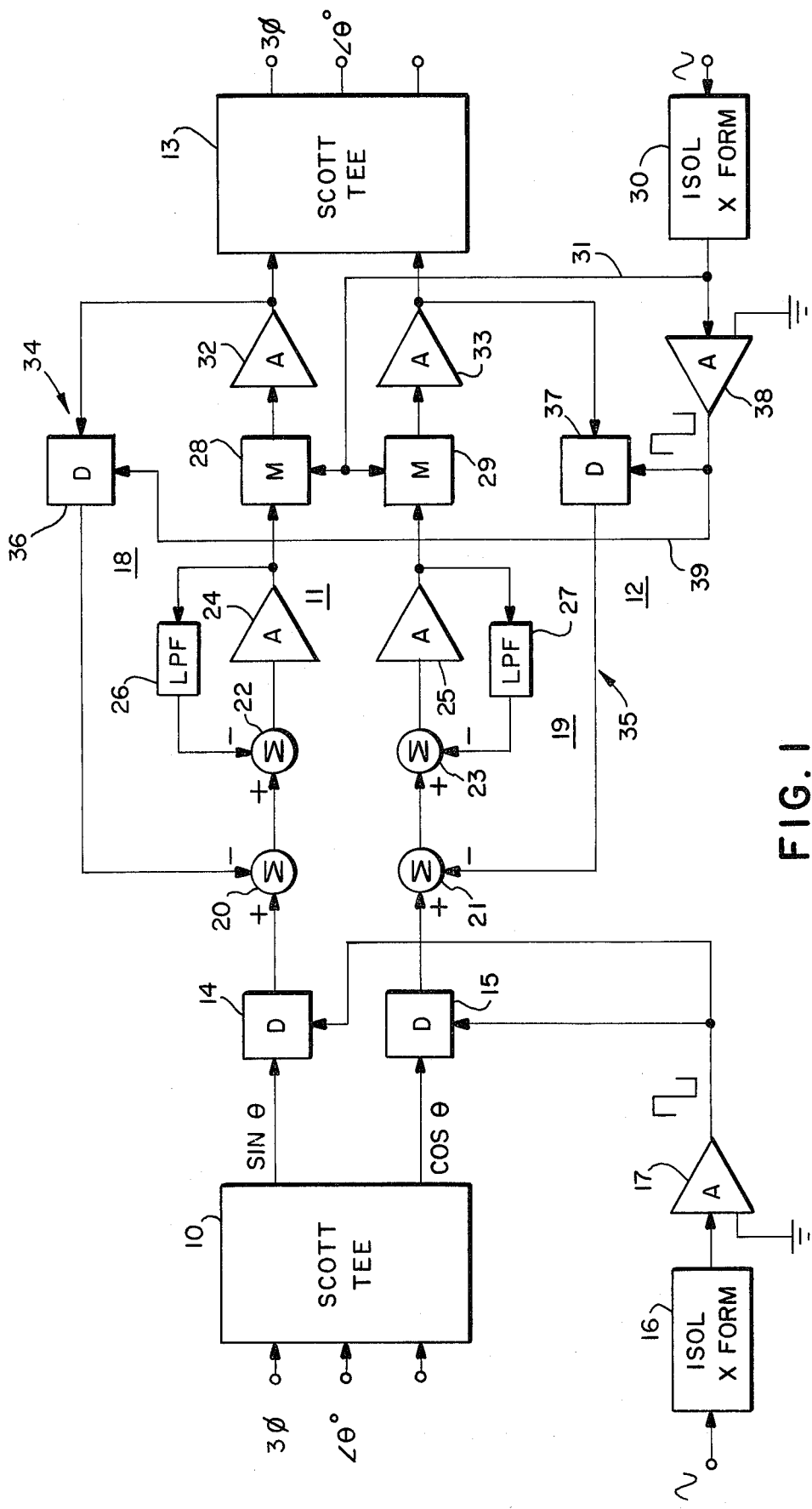

United States Patent [19]

Steglich

[11] 4,084,121
[45] Apr. 11, 1978

[54] SOLID STATE REPEATER FOR THREE WIRE SYNCHRO WITH SELECTABLE PHASE AND FREQUENCY ADJUSTMENT

[75] Inventor: Helmar R. Steglich, Marblehead, Mass.

[73] Assignee: General Electric Company, Wilmington, Mass.

[21] Appl. No.: 756,057

[22] Filed: Jan. 3, 1977

[51] Int. Cl.² .............................................. G05B 1/06
[52] U.S. Cl. .............................. 318/654; 340/347 SY
[58] Field of Search ............................... 318/654, 655; 340/347 SY

[56] References Cited

U.S. PATENT DOCUMENTS

| 3,244,961 | 4/1966 | Adler | 318/654 X |
| 3,600,694 | 8/1971 | McCollum | 318/654 X |
| 3,848,172 | 11/1974 | Thomas | 318/654 X |
| 3,898,546 | 8/1975 | Haskins | 318/654 X |

Primary Examiner—B. Dobeck

[57] ABSTRACT

The instant invention relates to a repeater for processing signals from a three wire synchro to control carrier phasing and frequency, while retaining identity of the angular information. The solid state repeater consists of an arrangement in which the synchro signals bearing the angular information are first demodulated. The demodulated signals are thereafter remodulated in a closed loop modulating network.

The phase and frequency of the carrier which is modulated in the closed loop modulating network may be controlled as desired. The modulated carrier is impressed on a negative feedback path in which the signal is demodulated utilizing the selected carrier to produce a variable DC signal which is fed back to the input of the modulating loop so that at null balance the output signal from the modulating path duplicates the angular information from the three wire synchro except that the carrier phase and frequency is controlled as desired. In this fashion, a signal from a three wire synchro may be repeated and the phase and frequency controlled to complement the output equipment without requiring the use of mechanically servoed synchro repeaters.

4 Claims, 1 Drawing Figure

SOLID STATE REPEATER FOR THREE WIRE SYNCHRO WITH SELECTABLE PHASE AND FREQUENCY ADJUSTMENT

The instant invention relates to a synchro repeater circuit, and more particularly to a solid state repeater in which the carrier of the repeated output signal is selectively controlled as to phase and/or frequency.

In many control or indicating systems such as are commonly used in aircraft systems, a mechanical angular sensor, such as a three-wire synchro, is used to obtain primary indication of angular shift position. For example, a synchro may be coupled to the aircraft gyroscope to obtain an output signal which represents the gyroscope angular position. The output signals from such a primary sensor, i.e., the three wire synchro, are used to perform various control and indicating functions in the aircraft. Thus, the angular position signals may be utilized as inputs to auto-pilots, heads-up displays, in-flight data processing equipment as well as in directional and other displays. Often such a single sensor is not capable of interfacing with all of these equipments.

One limitation is related to limit on the power output from a synchro. If too many systems are driven from the output from the synchro the accuracy of the synchro is degraded and also there is a risk of damaging the synchro if it is loaded too heavily. Another limitation is incompatible grounding and AC phasing conditions between the synchro and the various control and indicating equipments which use the synchro signals. Each of the different equipments may have power supplies and circuitry which are not necessarily compatible with grounding and the phasing of the output from the synchro. It is desirable to lock the synchro signal to the electrical supply system for each of the different displays and control equipments which utilize this signal. As a result, in systems as they are known today, it is necessary that a synchro buffer repeater or a number of repeaters be utilized. This requires the use of mechanically servoed synchros whose reference or supply voltages can be manipulated as desired. However, mechanically servoed synchros are expensive, cumbersome, have slow response time and suffer from all of the reliability limitations that are inherent in any mechanical design.

Applicant has found that signals from a three wire synchro may be repeated and the phase and frequency of the carrier output selectively controlled in a completely solid state electronic system thereby eliminating the expensive, cumbersome, etc., mechanical repeaters with all the favorable cost and size improvements attendant thereto.

It is therefore a principal objective of the instant invention to provide a solid state synchro repeater with selectable carrier output.

Another objective of the invention is to provide a synchro repeater with selectable carrier output which contains no moving parts.

Still another objective of the invention is to provide a solid state repeater for a three-wire signal from a synchro which is simple, compact, smaller and less expensive than existing arrangements.

Still other objectives and advantages of the invention will become apparent as the description thereof proceeds.

Briefly, in accordance with one aspect of the invention, the three-wire synchro signals are converted in a Scott-Tee transformer or the like to two phase signals representative respectively of the sin and cos of the mechanical or shaft angle represented by the synchro output signals. The two phase signals are respectively demodulated to produce a varying DC output signals which represent the angular information i.e., the sin and cos of the synchro shaft angle $\theta$. The DC signals are applied as the modulating signals to closed loop modulating networks in which a carrier signal having the desired phase and frequency is modulated by the angular information. The modulating networks also contain negative feedback paths in which the output signals from the modulators are demodulated using the reference carrier of selected phase and frequency. The demodulated signal in each negative feedback path is fed back to the input of the modulating path until, at null balance, the output of the modulated signal accurately represents the angular information from the three wire synchro but with a carrier of any selected frequency and phase.

The novel features which are believed to be characteristic of this invention are set forth with particularity in the appended claims. The invention itself however, both as to its organization and mode of operation, together with further objectives and advantages may best be understood by reference to the following description taken in connection with the accompany drawings in which:

The sole FIGURE is a schematic illustration of the solid state repeater with selectable carrier phase and frequency.

The modulated three phase output signals from a three wire synchro which represent angular position are applied as one input to a Scott-Tee transformer shown at 10. Scott Tee 10 has Y connected synchro type primary winding, not shown, to which the three phase signals from the three wire synchro are coupled. The secondary of the Scott-Tee transformer, also not shown, has a pair of orthogonally wound windings so that the three phase output signal from the synchro representing the angular information is converted to a pair of output signals which are respectively representative of the sin and cos of the synchro shaft angle $\theta$. Scott-Tee transformers are well-known devices for transforming either a two-phase input to a three phase output or conversely, a three phase input to a two phase output as is the case Scott-Tee 10 in FIG. 1. Reference is hereby made to the text book "Alternating Current Machinery"-LV Bewley, MacMillan Company, N.Y. (1949) and particularly to pages 89-91 which describe the basic characteristics of the so-called Scott-Tee connection.

The modulated sin and cos $\theta$ signals are applied to a pair of signal processing networks 11 and 12 in which the sin and cos $\theta$ signals are first demodulated and then remodulated in a closed loop modulating network to produce a modulated output signal which duplicates the angular information in the output from the three wire synchro but with the phase and/or frequency of the carrier being selected to complement the phase, frequency and power requirements of the various equipments which utilize the repeated signals from the three-wire synchro. The modulated signals are then applied to a further Scott-Tee network 13 coupled to the signal processing networks to convert the two phase sin and cos $\theta$ signals to three wire signals which are utilized in the output equipments.

The sin and cos θ output signals from Scott-Tee transformer 10 are respectively applied as inputs to phase sensitive demodulators 14 and 15 in channels 11 and 12. The other input to demodulators 14 and 15 is a square wave reference carrier wave which has the same frequency as the excitation voltage to the three-wire synchro. To this end, a sinusoidal voltage from the excitation voltage source for the three wire synchro is also applied to isolation transformer 16 to isolate the repeater from the three wire synchro. The signal from isolation transformer 16 is applied to comparator amplifier 17 which has its other input terminal grounded. Amplifier 17 saturates at very low positive and negative voltage levels relative to ground so that the incoming sine wave is clipped producing a square wave voltage at its output which has the same frequency and phase as the excitation voltage for the three wire synchro. A square wave reference carrier signal is preferred in the event that the phase sensitive demodulators 14 and 15 are phase sensitive switching type demodulators since the switching devices respond more accurately and more rapidly to a square wave then they would to a sinusoidal reference carrier. The output of demodulators 14 and 15 are therefore varying DC voltages which are respectively proportional to the sine and cos of the shaft angle θ.

The output from demodulators 14 and 15 is utilized as DC modulating voltages to modulate a carrier signal of selected phase and frequency to produce a modulated output signal which duplicates the angular information from the three wire synchro but which has the desired carrier phase and frequency characteristics.

Modulation networks 18 and 19 are of the closed loop, null balanced type in which the incoming DC signal is utilized to modulate a carrier of selected phase and frequency. The modulated output signal is also applied to a negative feedback path in each of the modulating networks. The negative feedback paths contains suitable demodulators driven by the carrier of selected phase and frequency to produce a negative DC feedback signal which is compared with the varying DC output voltages from the demodulators 14 and 15. If any difference exists between the D.C. output from the demodulators 14 and 15 and the D.C. output from the demodulators in the negative feedback paths, modulating networks 18 and 19 are driven to force their equalization at null balance thereby enhancing the accuracy of the output signals from the solid state repeater.

The DC outputs from demodulators 14 and 15 which represent the sin and cos θ information are applied as one input to summing nodes 20 and 21 respectively. The demodulated D.C. signals from the negative feedback paths in networks 18 and 19 are the other inputs to those nodes. The signals are compared to drive the system to a null balance. The differential outputs from summing nodes 20 and 21 are applied as one input to summing nodes 22 and 23 respectively. The output from nodes 22 and 23 are applied to high gain amplifiers 24 and 25 in the modulating networks 18 and 19. Low pass filters 26 and 27 are included in negative feedback paths around amplifiers 24 and 25. The other input to summing nodes 22 and 23 at the input of amplifiers 24 and 25 is from the low pass filters. Low pass filters 26 and 27 are provided to prevent the loop from oscillating. It provides sufficient damping to prevent the modulated output signal from undergoing rapid preturbations. That is, the synchro output may in many cases be subject to "jitter." However, because of the presence of the low pass filters in the negative feedback paths for amplifiers 24 and 25, the output from these amplifiers is damped and as a result, the output from the solid state synchro repeater will be similarly damped and will not be subject to rapid preturbations due to jitter in the output of the primary sensor, i.e., the three wire synchro.

The amplified, damped, DC modulating voltages representative of the sin and cos of the shaft angle θ are applied as one input to multipliers 28 and 29. The other input to multipliers 28 and 29 is a carrier of selected phase and frequency. This carrier is provided from a sinusoidal reference source, not shown, which is applied to isolating transformer 30. The output from isolating transformer 30 is applied over lead 31 as the other input 10 multipliers 28 and 29. The outputs from multipliers 28 and 29 are therefore linear, amplitude modulated signals which are proportional to the sin and cos of the shaft angle θ but with the carrier signal having the desired phase and frequency. Modulated output signals from multiplers 28 and 29 are applied to power amplifiers 32 and 33 in which the signals are amplified and then applied to Scott-Tee transformer 13 where the two phase signal is converted to a three phase, three wire signal which may then be coupled to the control or indicating equipments as desired.

The outputs from amplifiers 32 and 33 are also applied to negative feedback loops 34 and 35 which are coupled between the output of the amplifier and summing nodes 20 and 21. The negative feedback paths contain phase sensitive demodulators 36 and 37 which demodulate the signals to produce a varying DC voltage proportional to sin θ and cos θ information. The DC voltages are applied as the other input to summing nodes 20 and 21. The carrier applied to phase sensitive demodulators 36 and 37 is a square wave having the same phase and frequency as the sinusoidal carrier applied to multipliers 28 and 29. To this end, the sinusoidal reference carrier from isolation transformer 30 is also applied to a comparator amplifier 38 which has it other input terminal grounded. Amplifier 38 saturates at very low positive and negative voltage levels relative to ground so that the sinusoidal signal is clipped and a square wave having the same phase and frequency as the sinusoidal carrier is produced at the output of the amplifier. This square wave is applied as the other input to demodulators 36 and 37 in which the amplified, modulated signals from multipliers 28 and 29 are demodulated. As pointed out previously the closed loop drives the output from demodulating networks so that the output from the networks duplicate the angular information from the three wire synchro but with the phase and frequency of the remodulated signal being that of the new carrier from the new reference signal source.

By virtue of the Scott-Tee transformers that are utilized at the input and output of the networks and the isolation transformers complete electrical isolation is maintained between inputs and outputs as well as between the carrier supplies.

It will also be appreciated that the accuracy of the system is greatly increased over straightforward demodulation, amplification and modulation because the modulator and the amplifiers are all within a closed loop. Consequently, the primary sources of error are the demodulators 14 and 15, 36 and 37, and amplifiers 24 and 25. However, these components can be designed for accuracy with a minimum of complexity. Modulators 28 and 29 and the output power amplifiers 32 and 33 which normally would require high precision devices and circuitry no longer need to have the same degree of accuracy because the null balancing loop corrects errors that may be due to these components. It may also be seen that by providing the power output amplifiers 32 and 33 in the loop the power level of the repeated signals may be increased so that many equipments may be driven without in any way affecting accuracy by the repeated signals. This eliminates or obviates one of the problems associated with trying to drive too many equipments from the output of the synchro namely loss of accuracy and overloading of the synchro.

While a number of specific embodiments of this invention have been shown and described above, it will, of course, be understood that the invention is not limited thereto since many modifications, both in the circuit arrangement and in the instrumentalities employed therein, may be made. It is contemplated by the appended claims to cover any such modifications which fall within the true spirit and scope of this invention.

What is new and desired to be covered by Letters Patent of the U.S. is:

1. In a solid state synchro repeater for converting angular output information from a three wire synchro which takes the form of three phase, amplitude modulated signals of a given carrier phase and frequency to three phase, amplitude modulated signals carrying the same angular information on carrier having any selected phase or frequency, the combination comprising;
   a. means for receiving the three phase signals from a three wire synchro and converting the three phase signals to a pair of amplitude modulated signals proportional to the sin and cos of the shaft angle $\theta$,
   b. means for demodulating said pair of signals to produce a pair of D.C. signals proportional to the sin and cos of a shaft angle $\theta$,
   c. individual means for modulating a carrier of selectable frequency and phase with said pair of D.C. signals to produce modulated signals reproducing the angular shaft informative from said three wire synchro signals, including;
      1. a carrier signal source of selectable phase and frequency,
      2. individual, closed loop, modulating means,
      3. means to apply one of said D.C. signals and the carrier signal of selectable phase and frequency to said individual modulating means to produce modulated signals respectively proportional to the sin and cos of a shaft angle $\theta$,
      4. negative feedback means in each of said closed loop, modulating means,
      5. means to convert the modulated sin and cos $\theta$ signals with selectable carrier phase and frequency to three phase signals.

2. The solid state repeater according to claim 1 wherein said negative feedback paths include demodulating means, means to apply the carrier of selectable phase and frequency and the modulated signal from said closed loops to said demodulating means, and means to compare the D.C. signals from the demodulating means in said feedback paths to the D.C. signals from said means for demodulating whereby at null balance of each of said loops, the angular information from the three wire synchro is accurately repeated in the modulated signals from said loops.

3. The solid state repeater according to claim 2 wherein said means for receiving and converting the three phase signals is a Scott-Tee transformer.

4. The solid state repeater according to claim 3 wherein said means to convert the modulated signals from the individual, closed loop modulating means to three phase signals is a Scott-Tee transformer.

* * * * *